May 29, 1923.

R. J. CRABBE

WELL PLUG

Filed March 27, 1922

1,457,148

Patented May 29, 1923.

1,457,148

UNITED STATES PATENT OFFICE.

ROBERT J. CRABBE, OF WESTON, WEST VIRGINIA.

WELL PLUG.

well may be effectually packed against the passage of gas or liquid, as will be understood.

The improved device is simple in construction, can be manufactured of any required size and of any suitable material.

The preferred embodiment of the invention is disclosed in the drawings and set forth in the specification, but it will be understood that modifications within the scope of the claimed invention may be made in the construction without departing from the principle of the invention or sacrificing any of its advantages.

Having thus described the invention what is claimed as new is:—

1. A plug of the class described comprising a counter bored mandrel having reversely tapered upper and lower external portions, and a stop rib at the upper end of the upper tapered portion, a supporting disk, a stud rising from the disk and received in the counter bore of the mandrel, a tubular packing member supported by the disk with a bore tapered to conform substantially to the lower tapered portion of the mandrel, and breakable means for coupling the mandrel to the stud.

2. A plug of the class described comprising a mandrel having reversely tapered upper and lower portions and a stop rib at the upper end, an internally tapered tubular packing member, means for movably coupling said mandrel and the packing members and a plurality of wedge slips bearing initially on the upper tapered portion of the mandrel beneath the stop rib and adapted to lock the mandrel to the packing member.

3. A plug of the class described comprising a counter bored mandrel having reversely tapered upper and lower external portions and a stop rib at the upper end of the upper tapered portion, a supporting disk, a stud rising from the disk and received in the counter bore of the mandrel, a tubular packing member supported by the disk with a bore tapered to conform substantially to the tapered portion of the mandrel, a plurality of wedge slips bearing initially on the upper tapered portion of the mandrel and beneath the stop rib and adapted to lock the mandrel to the packing member.

4. A plug of the class described comprising a counter bored mandrel having reversely tapered upper and lower external portions, and a stop rib at the upper end of the upper tapered portion, a supporting disk, a stud rising from the disk and received in the counter bore of the mandrel, a tubular packing member supported by the disk with a bore tapered to conform substantially to the lower tapered portion of the mandrel, a breakable pin extending through the mandrel and the stud and operating to couple the mandrel and stud with the packing supported thereby initially in distended position.

In testimony whereof, I affix my signature hereto.

ROBERT J. CRABBE.